United States Patent
Aoki et al.

(10) Patent No.: US 6,580,500 B2
(45) Date of Patent: Jun. 17, 2003

(54) CHROMATIC DISPERSION DISTRIBUTION MEASUREMENT APPARATUS AND METHOD FOR THE SAME

(75) Inventors: Shoichi Aoki, Hamamatsu (JP); Akio Ichikawa, Hamamatsu (JP)

(73) Assignee: Ando Electric Co., Ltd., Tokyo (JP)

(*) Notice: Subject to any disclaimer, the term of this patent is extended or adjusted under 35 U.S.C. 154(b) by 0 days.

(21) Appl. No.: 10/068,964

(22) Filed: Feb. 11, 2002

(65) Prior Publication Data

US 2002/0113956 A1 Aug. 22, 2002

(30) Foreign Application Priority Data

Feb. 22, 2001 (JP) ......................................... 2001-047155

(51) Int. Cl.[7] .............................................. G01N 21/00
(52) U.S. Cl. ...................................................... 356/73.1
(58) Field of Search .......................... 356/73.1, 72, 477, 356/365, 450, 484, 634, 481; 250/227.18, 227.23, 227.14, 227.27; 359/109–110, 124–125, 161, 158, 189, 135, 188; 219/121.62, 121.68, 121.69; 385/12, 14

(56) References Cited

U.S. PATENT DOCUMENTS

| | | | |
|---|---|---|---|
| 5,956,131 A | 9/1999 | Mamyshev et al. | |
| 5,999,289 A | * 12/1999 | Ihara et al. | ............... 356/73.1 |

FOREIGN PATENT DOCUMENTS

| | | |
|---|---|---|
| EP | 0 819 926 A2 | 1/1998 |
| JP | A 10-83006 | 3/1998 |

\* cited by examiner

Primary Examiner—Tu T. Nguyen
(74) Attorney, Agent, or Firm—Oliff & Berridge, PLC.

(57) ABSTRACT

A chromatic dispersion distribution measurement apparatus for calculating a chromatic dispersion distribution in an optical communication path under test, includes an intensity ratio calculation unit for calculating an intensity ratio of a first light and a second light that are reflected from an optional position of the optical communication path under test and propagated to an incident end of the optical communication path under test by taking the same propagation time. A chromatic dispersion value calculation unit is provided for calculating a chromatic dispersion value in the optical communication path under test in accordance with the intensity ratio calculated by the intensity ratio calculation unit.

18 Claims, 5 Drawing Sheets

CHROMATIC DISPERSION DISTRIBUTION MEASUREMENT APPARATUS AND METHOD FOR THE SAME

BACKGROUND OF THE INVENTION

1. Field of the Invention

The present invention relates to a chromatic dispersion distribution measurement apparatus for measuring chromatic dispersion distribution in an optical communication path, such as an optical fiber or the like, and a method for the same.

2. Description of Related Art

In optical communication systems, the chromatic dispersion is one of the causes that prevent high-speed of transmission signals or the wavelength division multiplexing (WDM) transmission or the like. The chromatic dispersion is a phenomenon that each speed of the transmission signals which propagate through an optical fiber varies with each wavelength of the transmission signals. In order to suppress the deterioration of the transmission signals, which is caused by the chromatic dispersion, to a minimum, it is required to control the chromatic dispersion value in an optical transmission line. Therefore, in the construction of the optical communication systems, a technique of measuring precisely a chromatic dispersion characteristic has been important.

In earlier technology, as what measures the chromatic dispersion characteristic, for example, there is a technique of measuring dispersion distribution in a longitudinal direction of an optical fiber under test, which is disclosed in Japanese Patent Publication No. Tokukai-Hei 10-83006 (corresponding to the U.S. Pat. No. 5,956,131 and European Patent Application No. 0819926A2). In the disclosure, two optical pulses with distinct wavelength are inputted into an optical fiber under test, and a four wave mixing (FWM) light is generated according to the interaction of the two optical pulses with distinct wavelength. Then, a specific wavelength component is extracted from a back-scattered light of the FWM light by an optical band pass filter (BPF) and measured by an optical time domain reflectometer (OTDR).

However, in such a technique described above, there was a case that the dispersion distribution in the optical fiber under test itself could not be measured precisely. Particularly, when a long optical fiber is constructed, or the like, a plurality of short optical fibers are connected, and the loss (splice loss) is generated in the connecting points. Then, the phases of the optical pulses are fluctuated remarkably according to the intensity change generated by the loss. Therefore, there was a problem that the substantial chromatic dispersion value in the optical fiber is affected by the fluctuation (splice loss).

SUMMARY OF THE INVENTION

The present invention was made in view of the above-described problem. An object of the present invention is to provide a chromatic dispersion distribution measurement apparatus which can measure the chromatic dispersion in an optical communication path itself, such as an optical fiber or the like, in high accuracy by canceling the error caused by the steep loss, that is, caused by decreasing the intensity of lights dramatically, such as the splice loss or the like, in the optical communication path under test. Another object is to provide a method for the same.

In order to solve the above-described problem, according to a first aspect of the present invention, a chromatic dispersion distribution measurement apparatus for calculating a chromatic dispersion distribution in an optical communication path under test, comprises: an intensity ratio calculation unit for calculating an intensity ratio of a first light and a second light that are reflected from an optional position of the optical communication path under test and propagated to an incident end of the optical communication path under test by taking the same propagation time; and a chromatic dispersion value calculation unit for calculating a chromatic dispersion value in the optical communication path under test in accordance with the intensity ratio calculated by the intensity ratio calculation unit.

In the specification, the term "optical communication path under test" is a general term of all of the objects to be tested for the optical characteristics, such as an optical fiber, an optical cable or the like.

The first light may be reflected from the optical communication path under test when a first optical pulse having a single wavelength is directed on the incident end of the optical communication path under test, and the second light may be reflected from the optical communication path under test when a second optical pulse having a plurality of wavelengths which are reciprocally distinct is directed on the incident end of the optical communication path under test.

The chromatic dispersion distribution measurement apparatus may further comprise: a first measurement unit for measuring an intensity of the first light for each propagation time of the first light; and a second measurement unit for measuring an intensity of the second light for each propagation time of the second light. Further, the chromatic dispersion distribution measurement apparatus may comprise a storing unit for storing one of the intensity of the first light, which is measured by the first measurement unit, and the intensity of the second light, which is measured by the second measurement. The intensity ratio calculation unit may calculate the intensity ratio of the first light and the second light with reference to the intensity stored in the storing unit.

The chromatic dispersion distribution measurement apparatus may further comprise: a first light source for generating the first optical pulse and the second optical pulse; and a second light source for generating the second optical pulse. Further, the chromatic dispersion distribution measurement apparatus may comprise an optical switch unit for actuating the first light source and the second light source.

Moreover, logarithms of both an intensity of the first light and an intensity of the second light may be taken, and a difference between the logarithms may be calculated by the intensity ratio calculation unit so as to obtain the intensity ratio of the first light and the second light.

In the present invention, the first light may be a back-scattered light of a light having a single wavelength, and the second light may be a back-scattered light of a four wave mixing light.

According to the present invention, the intensity ratio calculation unit calculates the intensity ratio of the first light and the second light that are reflected from an optional position of the optical communication path under test and propagated to the incident end of the optical communication path under test by taking the same propagation time. Further, the chromatic dispersion value calculation unit calculates the chromatic dispersion value in the optical communication path under test in accordance with the intensity ratio calculated by the intensity ratio calculation unit. Therefore, an error caused by the splice loss or the like in the optical communication path under test can be canceled. That is, since both the intensity of the first light and that of the second light are influenced by the splice loss or the like, in the optical communication path under test, the splice loss or the like can be canceled when the ratio of these intensities is calculated. Therefore, the chromatic dispersion in an optical communication path under test itself can be measured in high accuracy.

According to a second aspect of the present invention, a chromatic dispersion distribution measurement apparatus comprises: a first measurement unit for measuring an intensity of a first back-scattered light for each propagation time of the first back-scattered light at predetermined sampling timing intervals, the first back-scattered light being reflected from an optical communication path under test when a first optical pulse having a single wavelength is directed on the optical communication path under test; a second measurement unit for measuring an intensity of a second back-scattered light for each propagation time of the second back-scattered light at predetermined sampling timing intervals, the second back-scattered light being reflected from the optical communication path under test when a second optical pulse having a plurality of wavelengths which are reciprocally distinct is directed on the optical communication path under test; an intensity ratio calculation unit for calculating an intensity ratio of the first back-scattered light and the second back-scattered light that are reflected from an optional position of the optical communication path under test and propagated to an incident end of the optical communication path under test by taking the same propagation time, in accordance with the intensity of the first back-scattered light, which is measured by the first measurement unit, and the intensity of the second back-scattered light, which is measured by the second measurement unit; and a chromatic dispersion value calculation unit for calculating a chromatic dispersion value in the optical communication path under test in accordance with the intensity ratio calculated by the intensity ratio calculation unit.

The chromatic dispersion distribution measurement apparatus may further comprise: a first light source for generating the first optical pulse and the second optical pulse; and a second light source for generating the second optical pulse. Further, the chromatic dispersion distribution measurement apparatus may comprise an optical switch unit for actuating the first light source and the second light source.

The chromatic dispersion distribution measurement apparatus may further comprise a storing unit for storing one of the intensity of the first back-scattered light, which is measured by the first measurement unit, and the intensity of the second back-scattered light, which is measured by the second measurement unit. The intensity ratio calculation unit may calculate the intensity ratio of the first back-scattered light and the second back-scattered light with reference to the intensity stored in the storing unit.

In the present invention, logarithms of both the intensity of the first back-scattered light and the intensity of the second back-scattered light may be taken, and a difference between the logarithms may be calculated by the intensity ratio calculation unit so as to obtain the intensity ratio of the first back-scattered light and the second back-scattered light. Further, the second back-scattered light may be a four wave mixing light.

According to the present invention, the first measurement unit measures the intensity of the first back-scattered light that is reflected from an optional position of the optical communication path under test when the first optical pulse having a single wavelength is directed on the incident end of the optical communication path under test, for each propagation time of the first back-scattered light at predetermined sampling timing intervals. The second measurement unit measures the intensity of the second back-scattered light that is reflected from an optional position of the optical communication path under test when the second optical pulse having a plurality of wavelengths which are reciprocally distinct is directed on the incident end of the optical communication path under test, for each propagation time of the second back-scattered light at predetermined sampling timing intervals. In this case, when a splice point or the like exists in the optical communication path under test, both the intensity of the first back-scattered light and that of the second back-scattered light are changed dramatically in the splice point.

Thereby, the intensity ratio calculation unit calculates the intensity ratio of the first back-scattered light and the second back-scattered light that are reflected from an optional position of the optical communication path under test and propagated to the incident end of the optical communication path under test by taking the same propagation time, in accordance with the intensity of the first back-scattered light, which is measured by the first measurement unit, and the intensity of the second back-scattered light, which is measured by the second measurement unit. Further, since the chromatic dispersion value calculation unit calculates the chromatic dispersion value in the optical communication path under test in accordance with the intensity ratio calculated by the intensity ratio calculation unit, an error caused by the splice loss or the like in the optical communication path under test can be canceled. That is, since both the intensity of the first back-scattered light and that of the second back-scattered light are influenced by the splice loss or the like in the optical communication path under test, the splice loss or the like can be canceled when the ratio of these intensities is calculated. Therefore, the chromatic dispersion in an optical communication path under test itself can be measured in high accuracy.

According to a third aspect of the present invention, a chromatic dispersion distribution measurement method comprises: calculating an intensity ratio of a first light and a second light that are reflected from an optional position of an optical communication path under test and propagated to an incident end of the optical communication path under test by taking the same propagation time; and calculating a chromatic dispersion value in the optical communication path under test in accordance with the calculated intensity ratio.

In the chromatic dispersion distribution measurement method, the first light may be reflected from the optical communication path under test when a first optical pulse having a single wavelength is directed on the incident end of the optical communication path under test, and the second light may be reflected from the optical communication path under test when a second optical pulse having a plurality of wavelengths which are reciprocally distinct is directed on the incident end of the optical communication path under test.

The chromatic dispersion distribution measurement method may further comprise: measuring an intensity of the first light for each propagation time of the first light; and measuring an intensity of the second light for each propagation time of the second light. Further, the chromatic dispersion distribution measurement method may comprise storing one of the measured intensity of the first light, and the measured intensity of the second light. The intensity ratio of the first light and the second light may be calculated in the intensity ratio calculating with reference to the stored intensity.

In the chromatic dispersion distribution measurement method, logarithms of both the intensity of the first light and the intensity of the second light may be taken, and a difference of the logarithms may be calculated in the intensity ratio calculating so as to obtain the intensity ratio of the first light and the second light.

In the present invention, the first light may be a back-scattered light of a light having a single wavelength, and the second light may be a back-scattered light of a four wave mixing light.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

PREFERRED EMBODIMENT OF THE INVENTION

Figure 1:
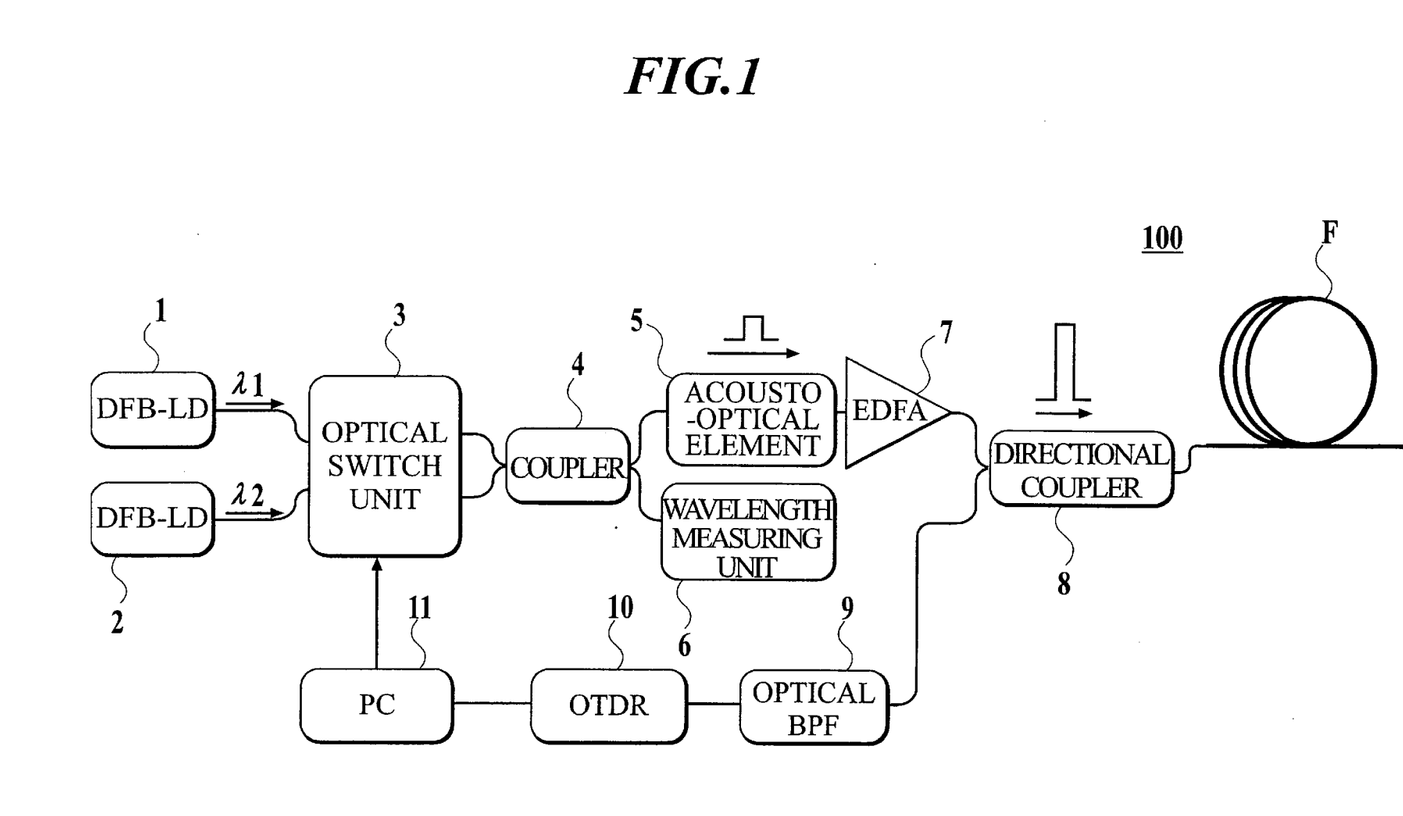
FIG. 1 is a block diagram showing a chromatic dispersion distribution measurement apparatus according to an embodiment of the present invention.

FIG. 1 is a block diagram showing a structure of a chromatic dispersion distribution measurement apparatus 100 according to an embodiment of the present invention. The chromatic dispersion distribution measurement apparatus 100 comprises a distributed feed back-laser diode (DFB-LD) 1 as a first light source, a DFB-LD 2 as a second light source, an optical switch unit 3, a coupler (Coupler Unit) 4, an acousto-optical element 5, a wavelength measuring unit 6, an erbium-doped fiber amplifier (EDFA) 7, a directional coupler 8, an optical band pass filter (BPF) 9, an optical time domain reflectometer (OTDR) 10 as a first measurement unit, a second measurement unit or the like, an a personal computer (PC) 11 as an intensity ratio calculation unit, a chromatic dispersion value calculation unit, a storing unit or the like.

The DFB-LD 1 and the DFB-LD 2 are light sources that output lights having wavelengths λ1 and λ2 which are reciprocally distinct, respectively. The optical switch unit 3 actuates or controls the DFB-LD 1 and DFB-LD 2 in accordance with the control signals outputted from the PC 11.

The coupler 4 distributes and outputs a reference light emitted from the DFB-LD 1 to the acousto-optical element 5 and the wavelength measuring unit 6 when only the DFB-LD 1 is actuated. On the other hand, when both the DFB-LD 1 and the DFB-LD 2 are actuated, the coupler 4 couples the lights emitted from the DFB-LDs 1 and 2 at first.

Then, the coupler 4 distributes and outputs the coupled light to the acousto-optical element 5 and the wavelength measuring unit 6.

The acousto-optical element 5 shapes the reference light or the coupled light outputted from the coupler 4, into a pulse form. The obtained optical pulse is outputted from the acousto-optical element 5 to the EDFA 7. The wavelength measuring unit 6 outputs the wavelength of the light outputted from the coupler 4 in a monitor thereof.

The EDFA 7 amplifies the optical pulse outputted from the acousto-optical element 5 and outputs the amplified optical pulse to the directional coupler 8. The directional coupler 8 outputs the amplified optical pulse to an optical fiber F (an optical communication path under test) that is an object to be measured. On the other hand, the directional coupler 8 outputs the whole reflected lights reflected from the optical fiber F, to the optical BPF 9.

The optical BPF 9 passes only a light having a specific wavelength component among the whole reflected lights which are reflected from the optical fiber F. Then, the light passed through the optical BPF 9 is outputted to the OTDR 10. Here, as a specific wavelength component, either a Stokes wavelength or an anti-Stokes wavelength of an FWM light may be selected. In the embodiment of the present invention, the anti-Stokes wavelength is selected.

The OTDR 10 calculates data which shows the chromatic dispersion distribution in the optical fiber F on the basis of the light passed through the optical BPF 9. Then, the calculated data are outputted to the PC 11. The PC 11 comprises a random access memory (RAM) for temporarily storing the data outputted and inputted from the OTDR 10. The PC 11 performs various later-described arithmetic processings for the data stored in the RAM.

Hereinafter, an operation of the chromatic dispersion distribution measurement apparatus 100 will be explained with reference to FIGS. 2 to 5.

Figure 2:
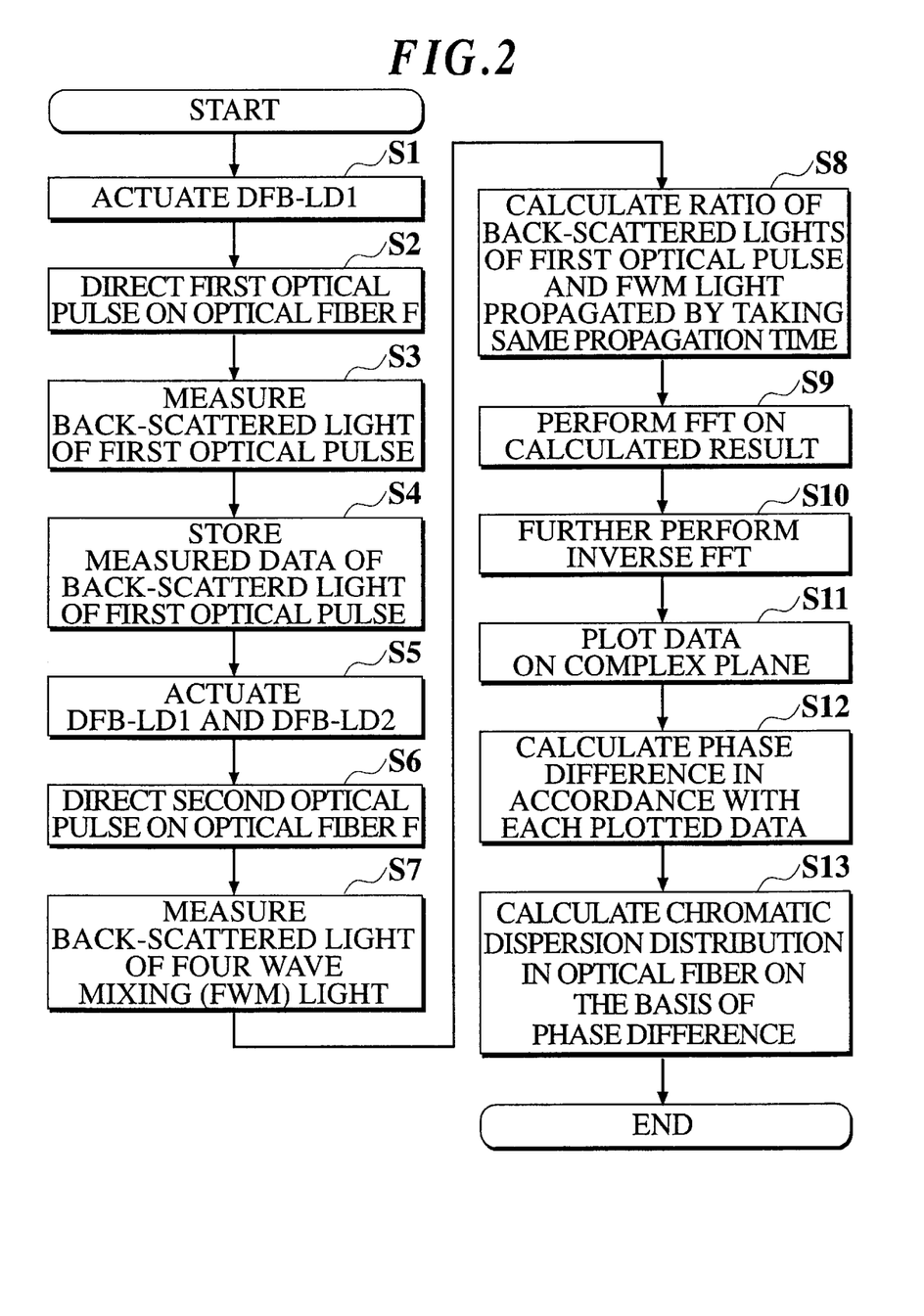
FIG. 2 is a flowchart showing an operation of the chromatic dispersion distribution measurement apparatus.

At first, the PC 11 outputs a control signal for actuating only the DFB-LD 1, to the optical switch unit 3. Thereby, the DFB-LD 1 is actuated (step S1), so that a reference light is emitted from the DFB-LD 1. The emitted reference light is distributed and outputted to the acousto-optical element 5 and the wavelength measuring unit 6 by the coupler 4. The reference light outputted to the acousto-optical element 5 is formed into a first optical pulse by the acousto-optical element 5. The first optical pulse is amplified by the EDFA 7 and inputted into the optical fiber F through the directional coupler 8 (step S2).

The first optical pulse directed on the optical fiber F causes the Rayleigh scattering in the inside of the core in the optical fiber F. Further, the first optical pulse causes the Fresnel reflection in the fractured points, the splice points (connecting points), and other unusual points in the optical fiber F. As a result, the back-scattered lights of the first optical pulse are reflected toward the incident end side of the optical fiber F. Hereinafter, the incident end means an end of the optical fiber F, where an optical pulse amplified by the EDFA 7 is directed. The back-scattered lights of the first optical pulse are directed on and the optical BPF 9 through the directional coupler 8. Then, the back-scattered lights of the first optical pulse passed through the optical BPF 9 are directed on the OTDR 10.

The OTDR 10 measures the intensity of the back-scattered lights of the first optical pulse inputted through the optical BPF 9 as a function of the propagation time of the back-scattered lights of the first optical pulse (step S3). That is, the OTDR 10 measures the intensity of the back-scattered lights of the first optical pulse for each propagation time of the back-scattered lights of the first optical pulse at predetermined sampling timing intervals.

Figure 3:
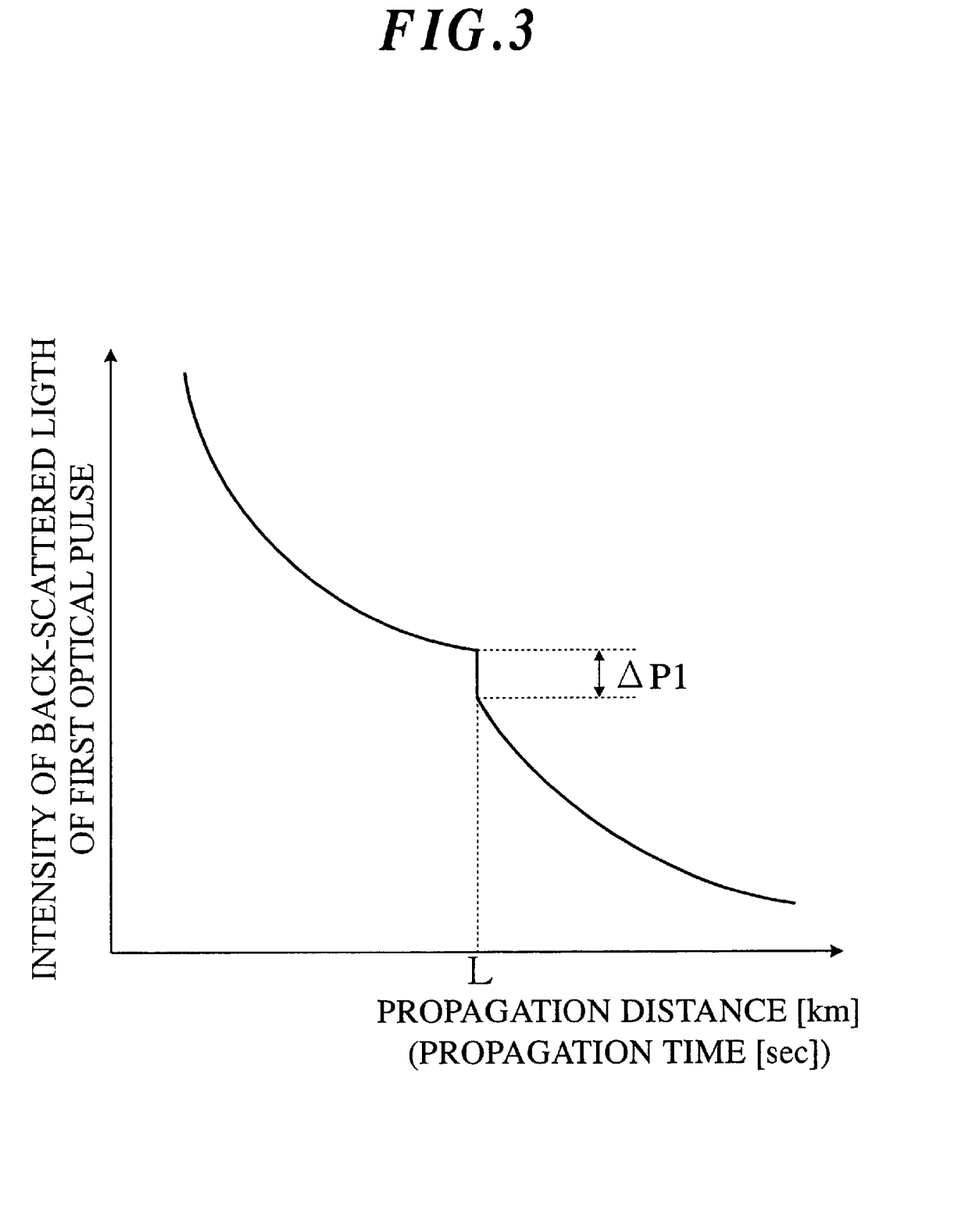
FIG. 3 is a graph showing the intensity of the back-scattered lights generated in an optical fiber of the chromatic dispersion distribution measurement apparatus.

Here, an example of the monitored data showing the intensity of the measured back-scattered lights of the first optical pulse is shown in FIG. 3. In FIG. 3, the ordinate axis shows the intensity of the back-scattered lights of the first optical pulse, and the abscissa axis shows the propagation time [sec] of the back-scattered lights of the first optical pulse. In addition, since the propagation time is the elapsed time period from the time when the back-scattered lights of the first optical pulse are reflected from a predetermined position in a longitudinal direction of the optical fiber F, to the time when the reflected lights are back to the incident end, the propagation time is substantially equivalent to the propagation distance.

Therefore, the abscissa axis may show the propagation distance [km], that is, the length of the optical fiber F. Further, in FIG. 3, $\Delta P1$ denotes the splice loss in the connecting point. As shown in FIG. 3, the intensity of the back-scattered lights of the first optical pulse is dramatically deteriorated in the connecting point or the like.

Next, the OTDR 10 outputs time-series data showing the intensity of the back-scattered lights of the first optical pulse that are measured as a function of the propagation time, to the PC 11. Then, the PC 11 stores the time-series data outputted from the OTDR 10 in, for example, an array A[i] (i=1, 2, ..., n, where i indicates the intensity data number and n indicates the number of data in the array A), and memorizes it in the RAM which is not shown in the figure.

Then, the PC 11 operates (calculates) the ratio of the intensity at each point in the time-series data stored in the array A[i], to the peak value (not shown in the figure) in the near-end of the optical fiber F. Here, the near-end means the vicinity of the above-mentioned incident end of the optical fiber F. In other words, it is the propagation distance in the vicinity of zero in FIG. 3. Each ratio is stored in an array AA[i] (i=1, 2, ..., n, where i indicates the intensity data number and n indicates the number of data in the array AA). That is, the PC 11 operates and memorizes AA[i]=A[i]/A[1] (i=1, 2, ..., n, where i indicates the intensity data number and n indicates the number of data in the array A or AA) in the RAM which is not shown in the figure (step S4). Here, A[1] is the peak value of the back-scattered lights of the first optical pulse in the near-end of the optical fiber F.

In addition, in a process of obtaining the time-series data from the OTDR 10, the PC 11 may firstly store the peak value in the near-end into the RAM, and then may divide the time-series data obtained afterward by the peak value in the near-end. Finally, the divided values may be stored in the array AA[i] in sequence.

Next, the PC 11 outputs the control signals for actuating both DFB-LD 1 and the DFB-LD 2, to the optical switch unit 3. Thereby, the DFB-LD 1 and the DFB-LD 2 are actuated (step S5), so that lights having wavelengths $\lambda 1$ and $\lambda 2$ are emitted from the DFB-LD 1 and the DFB-LD 2, respectively. The emitted lights are coupled by the coupler 4. The coupled light is formed in a second optical pulse by the acousto-optical element 5. Then, the second optical pulse is amplified by the EDFA 7 and directed on the optical fiber F through the directional coupler 8 (step S6).

The second optical pulse directed on the optical fiber F causes the Rayleigh scattering in the inside of the core in the optical fiber F. Further, the second optical pulse causes the Fresnel reflection in the fractured points, the splice points (connecting points), and other unusual points in the optical fiber F.

Since the second optical pulse is generated by coupling two lights having wavelengths $\lambda 1$ and $\lambda 2$, respectively, a Stokes light and an anti-Stokes light are generated from the two lights by the non linear optical effect of the optical fiber F. Thereby, the FMW light is generated and the back-scattered lights of the FWM light are reflected toward the incident end of the optical fiber F. The back-scattered lights of the FWM light are directed on the optical BPF 9 through the directional coupler 8, and only the anti-Stokes wavelength is extracted and directed on the OTDR 10.

The OTDR 10 measures the intensity of the FWM lights inputted through the optical BPF 9 as a function of the propagation time of the FWM lights (step S7). That is, the OTDR 10 measures the intensity of the FWM lights for each propagation time of the FWM lights at predetermined sampling timing intervals.

Figure 4:
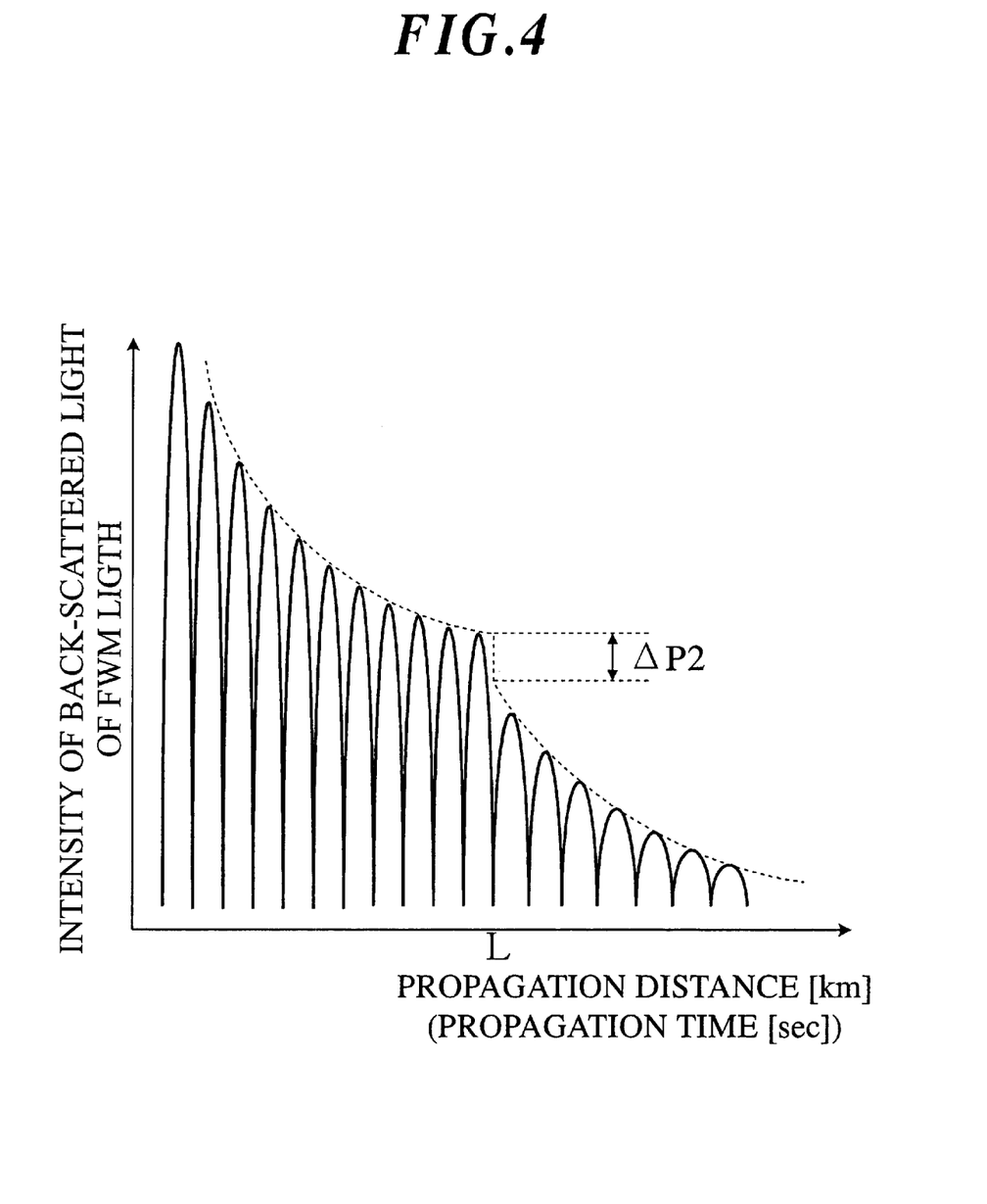
FIG. 4 is a graph showing the intensity of the FWM lights generated in the optical fiber of the chromatic dispersion distribution measurement apparatus.

Here, an example of monitored data showing the intensity of the measured FWM lights is shown in FIG. 4. In FIG. 4, the ordinate axis shows the intensity of the FWM lights, and the abscissa axis shows the propagation time [sec] of the FWM lights. In addition, since the propagation time is the elapsed time period from the time when the FWM lights are reflected from a predetermined position in a longitudinal direction of the optical fiber F, to the time when the reflected lights are back to the incident end, the propagation time is substantially equivalent to the propagation distance.

Therefore, the abscissa axis may be made to show the propagation distance [km], that is, the length of the optical fiber F. Further, as shown in FIG. 3, since there is a splice point in the position L [km] of the optical fiber F, the power of the FWM lights is deteriorated by $\Delta P2$ at the position L [km].

Then, the OTDR 10 outputs the time-series data showing the intensity of the FWM lights, which is measured as a function of the propagation time, to the PC 11. The PC 11 stores the time-series data outputted from the OTDR 10 in, for example, an array B[i] (i=1, 2, ..., n, where i indicates the intensity data number and n indicates the number of the data in the array B), and memorizes it in the RAM which is not shown in the figure.

Fourth, the PC 11 calculates the intensity ratio of the back-scattered lights and the FWM lights that are reflected from an optional position of the optical fiber F and propagated to an incident enc of the optical communication path under test by taking the same propagation time (step S8). That is, the PC 11 calculates B[i]/AA[i] with reference to each time-series data stored in the RAM, and stores the calculated results in an array C[i] (i=1, 2, ..., n, where i indicates the intensity data number and n indicates the number of the data in the array C).

Figure 5:
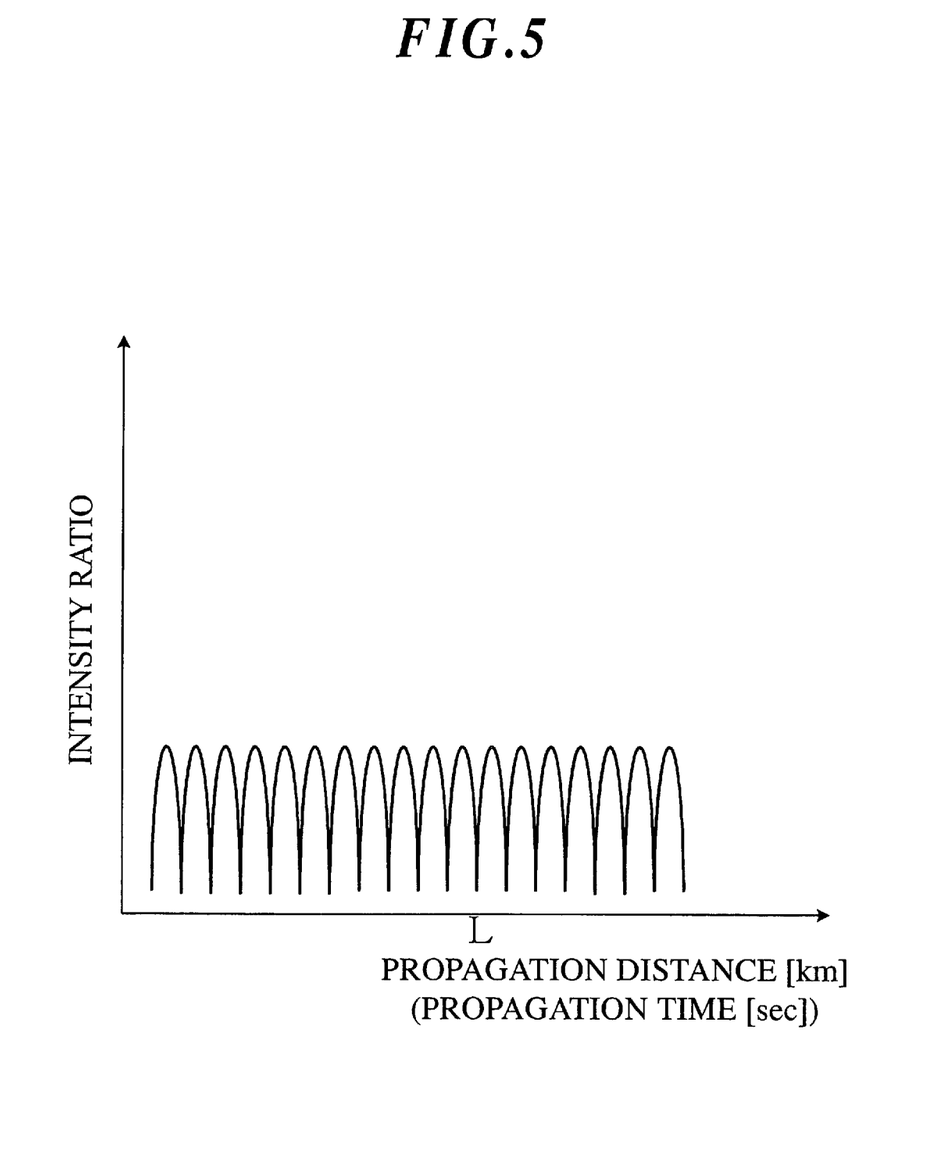
FIG. 5 is a graph showing the intensity ratio of the back-scattered lights and the FWM lights obtained by a step S8 in the operation in FIG. 2.

Thus, the intensity ratio of the back-scattered lights and the FWM lights is calculated. Here, when the time-series data stored in the array C[i] are plotted, a waveform having a uniform peak value, such as shown in FIG. 5, is obtained. In addition, the uniform peak value coincides with the peak value in the near-end shown in FIG. 4.

In addition, when the number of digits of each time-series data of the back-scattered lights and the FWM lights is large, the logarithms of the time-series data of both back-scattered lights and FWM lights may be previously taken and the difference between these data may be calculated to obtain the intensity ratio. The waveform of the calculated data is shown in FIG. 5. As shown in FIG. 5, the influence of the splice loss or the like in the propagation distance L [km] is canceled.

Finally, the PC 11 transforms the time-series data which shows the calculated intensity ratio, into a dispersion value.

That is, the PC 11 executes the fast Fourier transform (FFT) of the time-series data showing the calculated intensity ratio in order to calculate the data expressed by a frequency spectrum (step S9).

Here, although the spectrum is generated also in an area where the frequency is negative, only data having a positive frequency is taken out, considering the causality of an input-output system of optical pulses. Then, the inverse FFT of the data having a positive frequency is performed (step S10).

Thereby, data having the phase shifted by 90 degree with respect to the original time-series data is obtained. In addition, since the number of data decreases at this time, it is preferable to increase the number of data by interpolating data with a well-known interpolation method.

The PC 11 plots the data obtained in the step S10 on a complex plane (step S11) and calculates the phase difference $\Delta\theta(\lambda)$ between each adjacent data (step S12). Then, the PC 11 calculates the chromatic dispersion value (distribution) on the basis of the calculated phase difference $\Delta\theta(\lambda)$ (step S13).

According to the above-described chromatic dispersion distribution measurement apparatus 100, the following effects can be obtained.

At first, the chromatic dispersion distribution is obtained on the basis of the ratio of the intensity of back-scattered lights and the intensity of the FWM lights, both of which are affected by the splice loss or the like of the optical fiber F. Thereby, an error caused by the splice loss or the like can be canceled. Therefore, the chromatic dispersion in the optical fiber F itself can be measured in high accuracy.

Next, since the DFB-LD 1 which generates the first optical pulse and the DFB-LD 1 and DFB-LD 2 which generate the second optical pulse are used in common, it becomes unnecessary to provide separately a light source for the first optical pulse. As a result, the construction of the chromatic dispersion distribution measurement apparatus 100 can be made simple, and the cost thereof can be made inexpensive.

Finally, only the DFB-LD 1 is actuated when emitting the first optical pulse according to the control signal from the PC 11. On the other hand, both the DFB-LD 1 and the DFB-LD 2 are actuated when emitting the second optical pulse according to the control signals from the PC 11. Thereby, the switching of the light sources is substantially automated. Therefore, the operation to be carried out by an operator can be reduced.

As mentioned above, the chromatic dispersion distribution measurement apparatus 100 as a preferred example of the present invention was explained. However, according to a wide viewpoint of the present invention, it is needless to say that the detail construction and function of the chromatic dispersion distribution measurement apparatus 100 can be modified appropriately. For example, an extra light source for generating the first optical pulse may be provided besides the DFB-LD 1 and the DFB-LD 2. In this case, the optical switch unit can be omitted. Further, a wavelength tunable light source may be provided instead of the DFB-LD 1 or DFB-LD 2.

According to the present invention, since the chromatic dispersion value is calculated in accordance with the intensity ratio of the first light and the second light both of which are affected by splice loss or the like in the optical communication path under test, an error caused by the splice loss or the like can be canceled. Therefore, the chromatic dispersion in the optical communication path under test itself can be measured in high accuracy.

The entire disclosure of Japanese Patent Application No. 2001-47155 filed on Feb. 22, 2001 including specification, claims, drawings and summary are incorporated herein by reference in its entirety.

What is claimed is:

1. A chromatic dispersion distribution measurement apparatus for calculating a chromatic dispersion distribution in an optical communication path under test, comprising:

an intensity ratio calculation unit for calculating an intensity ratio of a first light and a second light that are reflected from a position of the optical communication path under test and propagated to an incident end of the optical communication path under test by taking the same propagation time; and a chromatic dispersion value calculation unit for calculating a chromatic dispersion value in the optical communication path under test in accordance with the intensity ratio calculated by the intensity ratio calculation unit, wherein the first light is reflected from the optical communication path under test when a first optical pulse having a single wavelength is directed on the incident end of the optical communication path under test, and the second light is reflected from the optical communication path under test when a second optical pulse having a plurality of wavelengths which are reciprocally distinct is directed on the incident end of the optical communication path under test.

2. The chromatic dispersion distribution measurement apparatus as claimed in claim 1, further comprising:

a first light source for generating the first optical pulse and the second optical pulse; and a second light source for generating the second optical pulse.

3. The chromatic dispersion distribution measurement apparatus as claimed in claim 2, further comprising:

an optical switch unit for actuating the first light source and the second light source.

4. The chromatic dispersion distribution measurement apparatus as claimed in claim 1, further comprising:

a first measurement unit for measuring an intensity of the first light for each propagation time of the first light; and a second measurement unit for measuring an intensity of the second light for each propagation time of the second light.

5. The chromatic dispersion distribution measurement apparatus as claimed in claim 4, further comprising:

a storing unit for storing one of the intensity of the first light, which is measured by the first measurement unit, and the intensity of the second light, which is measured by the second measurement unit;

wherein the intensity ratio calculation unit calculates the intensity ratio of the first light and the second light with reference to the intensity stored in the storing unit.

6. The chromatic dispersion distribution measurement apparatus as claimed in claim 1, wherein logarithms of both an intensity of the first light and an intensity of the second light are taken, and a difference between the logarithms is calculated by the intensity ratio calculation unit so as to obtain the intensity ratio of the first light and the second light.

7. The chromatic dispersion distribution measurement apparatus as claimed in claim 1, wherein the first light is a back-scattered light of a light having a single wavelength, and the second light is a back-scattered light of a four wave mixing light.

8. A chromatic dispersion distribution measurement apparatus comprising:

a first measurement unit for measuring an intensity of a first back-scattered light for each propagation time of the first back-scattered light at predetermined sampling timing intervals, the first back-scattered light being reflected from an optical communication path under test when a first optical pulse having a single wavelength is directed on the optical communication path under test;

a second measurement unit for measuring an intensity of a second back-scattered light for each propagation time of the second back-scattered light at predetermined sampling timing intervals, the second back-scattered light being reflected from the optical communication path under test when a second optical pulse having a plurality of wavelengths which are reciprocally distinct is directed on the optical communication path under test;

an intensity ratio calculation unit for calculating an intensity ratio of the first back-scattered light and the second back-scattered light that are reflected from a position of the optical communication path under test and propagated to an incident end of the optical communication path under test by taking the same propagation time, in accordance with the intensity of the first back-scattered light, which is measured by the first measurement unit, and the intensity of the second back-scattered light, which is measured by the second measurement unit; and a chromatic dispersion value calculation unit for calculating a chromatic dispersion value in the optical communication path under test in accordance with the intensity ratio calculated by the intensity ratio calculation unit.

9. The chromatic dispersion distribution measurement apparatus as claimed in claim 8, further comprising:

a first light source for generating the first optical pulse and the second optical pulse; and a second light source for generating the second optical pulse.

10. The chromatic dispersion distribution measurement apparatus as claimed in claim 9, further comprising:

an optical switch unit for actuating the first light source and the second light source.

11. The chromatic dispersion distribution measurement apparatus as claimed in claim 8, further comprising:

a storing unit for storing one of the intensity of the first back-scattered light, which is measured by the first measurement unit, and the intensity of the second back-scattered light, which is measured by the second measurement unit;

wherein the intensity ratio calculation unit calculates the intensity ratio of the first back-scattered light and the second back-scattered light with reference to the intensity stored in the storing unit.

12. The chromatic dispersion distribution measurement apparatus as claimed in claim 8, wherein logarithms of both the intensity of the first back-scattered light and the intensity of the second back-scattered light are taken, and a difference between the logarithms is calculated by the intensity ratio calculation unit so as to obtain the intensity ratio of the first back-scattered light and the second back-scattered light.

13. The chromatic dispersion distribution measurement apparatus as claimed in claim 8, wherein the second back-scattered light is a four wave mixing light.

14. A chromatic dispersion distribution measurement method comprising:

calculating an intensity ratio of a first light and a second light that are reflected from a position of an optical communication path under test and propagated to an incident end of the optical communication path under test by taking the same propagation time; and calculating a chromatic dispersion value in the optical communication path under test in accordance with the calculated intensity ratio, wherein the first light is reflected from the optical communication path under test when a first optical pulse having a single wavelength is directed on the incident end of the optical communication path under test, and the second light is reflected from the optical communication path under test when a second optical pulse having a plurality of wavelengths which are reciprocally distinct is directed on the incident end of the optical communication path under test.

15. The chromatic dispersion distribution measurement method as claimed in claim 14, further comprising:

measuring an intensity of the first light for each propagation time of the first light; and measuring an intensity of the second light for each propagation time of the second light.

16. The chromatic dispersion distribution measurement method as claimed in claim 15, further comprising:

storing one of the measured intensity of the first light, and the measured intensity of the second light;

wherein the intensity ratio of the first light and the second light is calculated in the intensity ratio calculating with reference to the stored intensity.

17. The chromatic dispersion distribution measurement method as claimed in claim 14, wherein logarithms of both the intensity of the first light and the intensity of the second light are taken, and a difference of the logarithms is calculated in the intensity ratio calculating so as to obtain the intensity ratio of the first light and the second light.

18. The chromatic dispersion distribution measurement method as claimed in claim 14, wherein the first light is a back-scattered light of a light having a single wavelength, and the second light is a back-scattered light of a four wave mixing light.

* * * * *